United States Patent [19]
Kübler

[11] 3,976,963
[45] Aug. 24, 1976

[54] TRANSDUCER FOR A PATH TRACER

[76] Inventor: Heinrich Kübler, Bahnhofstrasse 11, 6931 Zwingenberg (Neckar), Germany

[22] Filed: Mar. 7, 1975

[21] Appl. No.: 556,417

[30]   Foreign Application Priority Data
Apr. 19, 1974   Germany.............................. 2418860

[52] U.S. Cl.............................. 335/206; 200/84 C; 73/313
[51] Int. Cl.²................... H01H 35/18; G01F 23/10
[58] Field of Search.................... 335/206, 205, 207; 200/84 C; 73/313, DIG. 5

[56]   References Cited
UNITED STATES PATENTS
3,377,537   4/1968   Brailsford ........................... 335/206

3,505,869   4/1970   Crawford ......................... 335/206 X
3,656,074   4/1972   Bevilacqua et al. ................ 335/206

*Primary Examiner*—R. N. Envall, Jr.
*Attorney, Agent, or Firm*—Wenderoth, Lind & Ponack

[57]   ABSTRACT

A switching magnet is moveable along a row of magnetically operated switches and closes at least one switch opposite the magnet, which switches on a tap of a series circuit of resistors. The value of resistance is converted in an uninterrupted manner into an output of measured values dependent upon the position of the switching magnet.

5 Claims, 7 Drawing Figures

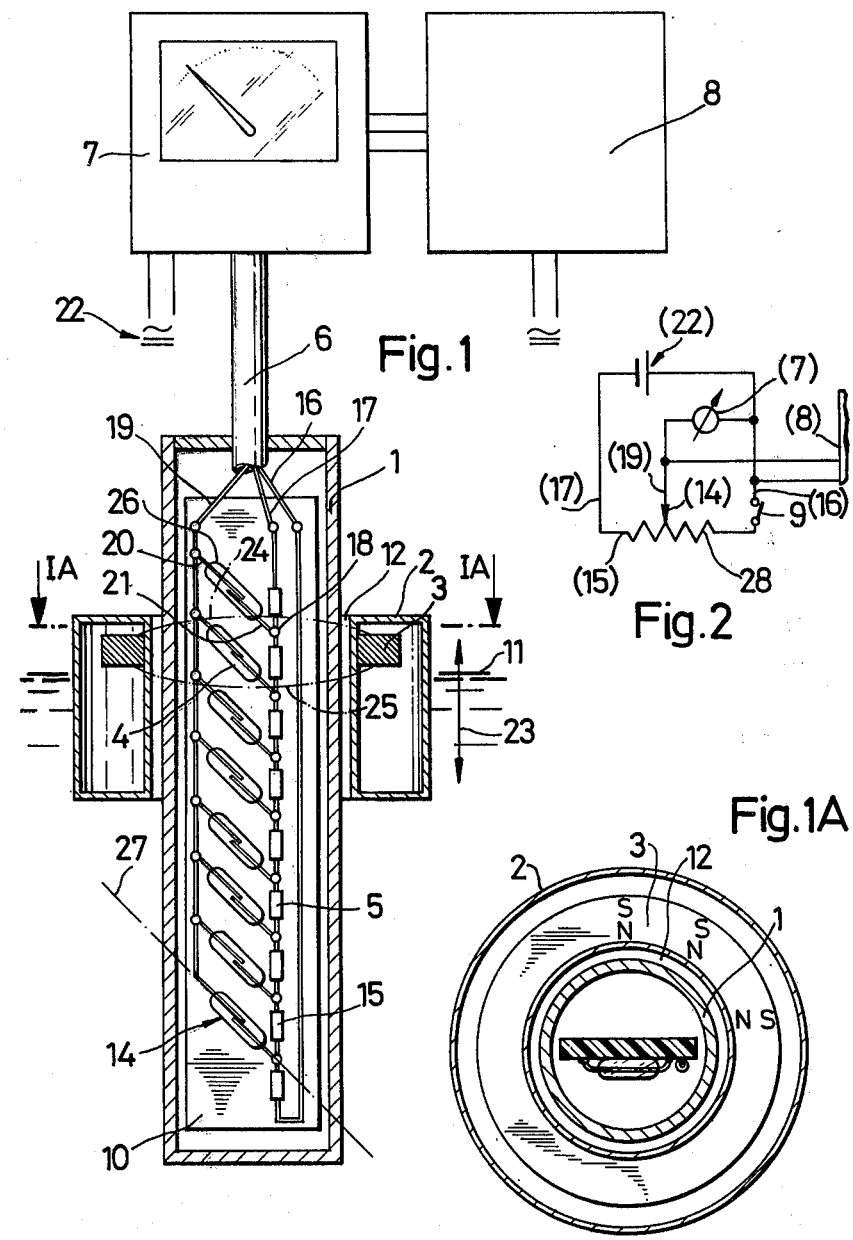

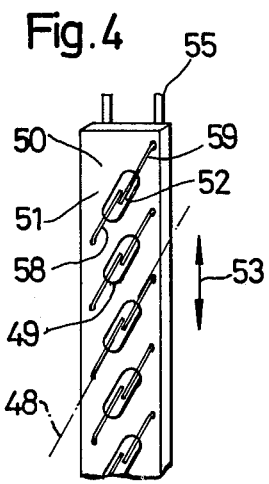
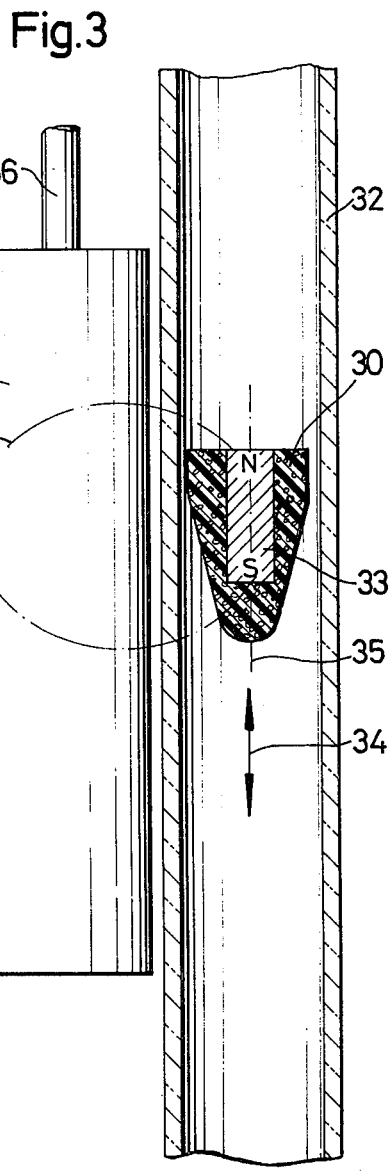
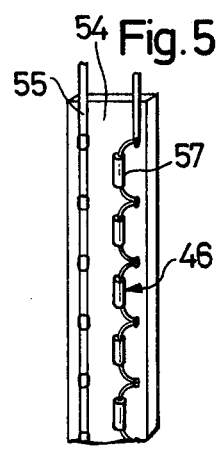
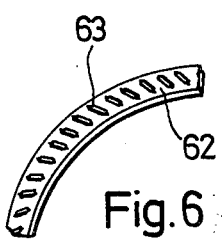

TRANSDUCER FOR A PATH TRACER

BACKGROUND AND SUMMARY OF INVENTION

The invention relates to a transducer for a path tracer with several normally opened switches arranged in a row along a path to be measured. The switches can be closed by a switching magnet, without contact therewith for a time during which the switching magnet faces each switch, while being moved along the row of switches. The switching magnet or the element to which the magnet is fastened is moved relative to the row of switches. It is insignificant in this connection, if the switching magnet is moved along the stationary row of switches or vice versa. With a known transducer of the type described, the switching magnet is moved along the row of switches by means of a float. The switches are arranged at such a spacing, that in any case only one switch can be closed. Each switch is associated with a flip-flop circuit, which circuit is closed by means of its associated switch and is opened again when the following switch is closed, so that always one flip-flop circuit is switched on. An indication is provided, of which flip-flop circuit is switched on, thus giving a stepwise indication of the level of the float. It is an object of the invention to improve the accuracy of measurement by simple means, and such object is achieved, by providing that at any position of the switching magnet facing the row of switches at least one switch is closed and that the switches are individually led away from a common measuring line and are connected sequentially to taps of a row of taps of a series circuit of resistors. The values of the resistances between the taps are converted by electric means into an output of measured values. The accuracy of measurement with such transducers is improved as the spacings between the switches in the row of switches are made smaller. According to the invention, such spacings can be very much smaller than with known transducer, because the only condition which must be ensured for a proper functioning is that in all cases at least one switch must be closed, and the functioning of the device will not be disturbed if in addition, for example due to magnetic dispersion, some other switches are also closed. Each switch needs only a section of the resistance of the series circuit of resistors with a respective tap, so that the circuitry is maintained simple, even if many switches are provided. In the most simple case, the output of the measured value is the electrical indication of the measured value of the resistance, which can be obtained in a simple manner and by means of potentiometers with three lines. Under certain circumstances, a simple measurement of resistors with only two lines, which can be tapped from the series circuit of resistors, will be possible. The electrical connection between the measuring point and the indicating point consequently requires only a small amount of line wire and a DC source will suffice for its operation. The invention has a versatile application, so that the measured path may be a straight line, curved or cornered, for example a segment of a circular arc, a full circle interrupted by the series circuit of resistors inserted at any point along the circumference, a path along the corners of a right-angled triangle, or a three-dimensional curvature, for example a helix. According to the invention, a closed switch must not open after the switching magnet has passed it and until the following switch is closed. Otherwise, the continuous alteration of the tapped resistor value would be interrupted. In case the switching magnet travels along, the row of switches in both directions, as in most applications, the accuracy of measuring will be higher the lower the amount of switches which can be closed simultaneously by the magnet. In the interest of a high accuracy, a further construction of the invention provides that the switching magnet will simultaneously effect the closing of both switches, when facing the space between two switches, but will not effect any other switch located at a larger distance.

In the interest of a higher accuracy of measurement, it is desirable, that the magnetic efficiency of the switching magnet be concentrated in a beam and especially suitable for this purpose is a ring put mounted around row of switches, which ring is magnetized permanently with its magnetic flux running in the radial direction.

The measured path can be easily indicated in linear terms by means of the invention. It is recommended for this purpose that the resistance value between two adjacent taps must be of equal size and that switches of the same type be arranged in rows at equal intervals. In such case, the tapped value of resistance is proportional to the measured path and in the case that the value of resistance is indicated in linear terms, then also the indication of the measured value would be linear. If, however, a non-linear indication is required, this can be easily done by a proper dimensioning in relation to the required functional dependency of the output of the measured value, either the interspacing of the switches, or the spacings between the switches, of the series resistor circuit or both values. The row of switches required according to the invention, with the associated series circuit of resistors, can be easily built as a standardized component which can be produced in defined lengths and if intermediate dimensions are required, they may be shortened to the required length. For such standardized circuit components, always the same indicating instrument can be used and a single setting resistor will suffice for adjusting the differing lengths of the resistors of the circuit.

A preferred construction of a standardized circuit element as described is characterized in that the switches, each of which is melted into a respective glass tube arranged on one flat side of an insulated flat carrier strip and having connecting line wires led out opposite ends, are arranged at an acute angle to the path to be measured and along the longitudinal axes of the glass tubes. The switches are arranged along the direction of the path to be measured in an overlapping manner. Connections located on the other side of the carrier strip are connected to the series circuit of resistors. The measuring line and the series circuit of resistors are arranged on the other flat side of the flat carrier strip.

The invention is preferably employed for indicating the level of liquids in containers. A suitable construction is characterized in that the switching magnet is arranged on a float body and that the magnet and float body slide along a guide tube, in the interior of which the carrier strip equipped with the switches and series resistor circuit is housed, thus protected against the access of liquid.

The invention is not limited to this application. It can be used for example for the measurement of paths, in which an element possibly equipped with a permanent magnet is moved along a limited path of measurement within the limits of the switching speed of the switches, for example for measuring the floating position of a floating body which is situated in a floating liquid, and for indicating the angular position of the rudder of a ship.

These and further objects, features and advantages of the present invention will become more apparent from the following description when taken in connection with the accompanying drawings which show for purposes of illustration only several embodiments in accordance with the present invention.

BRIEF DESCRIPTION OF THE DRAWINGS

FIG. 1 is a partially section schematic view of one embodiment of a transducer according to the invention, equipped with a level tracer, FIG. 1A is a section taken along line 1A—1A of FIG. 1, FIG. 2 is an equivalent electric circuit diagram of the system of FIG. 1, FIG. 3 is a partial section of a further example of a construction of a transducer according to the invention, designed as a tracer in a fluid flow path, FIG. 4 is a partial perspective view of a standardized circuit component, comprising a series circuit of resistors and a row of switches which can be used for the transducer according to the invention, FIG. 5 is a partial perspective view of the component of FIG. 4, but looking from the opposite side thereof, and FIG. 6 is a partial perspective view of a circuit element similar to FIG. 4, but curved for application in connection with a curved path to be measured.

DETAILED DESCRIPTION OF THE INVENTION

In FIG. 1, a liquid-proof tube 1 is made of copper or any other material, which cannot be magnetized, for example, of stainless steel, brass or plastic material, around which an annular floating body 2, housing an annular permanent magnet 3 is placed. Permanent magnet 3 surrounds tube 1 and is magnetized in its radial direction, as can be seen from FIG. 1a. The floating body 2 follows the rise of the level 11 of the liquid, into which tube 1 is dipped and movement of body 2 is guided by tube 1. Between tube 1 and the floating body 2 is an ample clearance 12 provided for this purpose.

Inside tube 1 an electrically insulated flat carrier strip 10 of plastic material is housed, on which a total of eight reed contact switches 4 are arranged, the total of which forms the row of switches 14. In addition, a plurality of ohmic resistors 5 are arranged on the carrier strip 10, the total of which forms the series resistor circuit 15. The series resistor circuit 15 is connected with each of its two ends to connecting lines 16, 17 and between each pair of resistors 5, a tap 18 is provided. All reed contact switches 4 are connected by means of respective connecting lines 20 to a measuring line 19. By further connecting lines 21, the reed contact switches 4 are individually connected in their proper sequence to respective taps 18 of the series resistor circuit 15. Both connecting lines 16 and 17 and the measuring line 19 are led out of the tube 1, which is of liquid-proof design, to the indicating instrument 7. Indicating instrument 7 is connected to a voltage source 22, a DC or AC source, preferably a DC source.

In the position of the floating body shown in the drawing, permanent magnet 3 is at the level of or opposite to the switch 4 which is arranged at the position of second from the top of the row of switches 14. This switch is closed due to the influence of the magnetic field, and all other switches 4 are opened. Permanent magnet 3 acts only within a closely limited area, when closing the switches of the row of switches 14. Such area is limited in FIG. 1 by two dot-and dash lines 24, 25. If floating body 2 travels downwards from the position shown in FIG. 1 along the measuring path indicated by the double arrow 23 in FIG. 1, the third switch from the top will be the first additional switch coming into such area and will be closed. Always at least one switch, but two switches at the maximal, are closed at the same time.

The switches are located inside individual glass tube 26, each having connecting wires 20 and 21 extending through the opposite ends thereof. The glass tube is filled with a protective gas and the switches are normally opened and they close again under the influence of the magnetic field, which is present between the dash-and-dot lines 24, 25. The reed contact switches 4 are arranged at an equal interspacing and parallel to one another relative to the axes 27 of the tubes 26 and for the sake of saving space at an angle to the path of measurement. The resistors 5 all have the same value. Consequently, the resistance value existing along the section of the row of resistors, which is tapped due to the momentarily closed switch or switches, between the connecting line 17 and the measuring line 19, is directly proportional to the indicated filling level. A resistance indication in linear terms at the indicating instrument 7 of the tapped resistor may be also adjusted in linear graduations, for example in centimeters.

The circuit diagram shown in FIG. 2 is accurate in the case, where only one of the switches is closed; closing of two switches results in a small insignificant modification. The series circuit of resistors 15 with the switches is represented by a potentiometer 28, to which DC is applied from the voltage source 22 and with which the voltage drop, measured via a central tap, is indicated at the indicating instrument 7. The respective reference numbers from FIG. 1 are shown in FIG. 2 in brackets. Line 16 may be omitted, so that the measuring is a pure current measurement, by placing the circuit switch 9, in FIG. 2 in an opened condition.

A control unit 8 for a two-step action controller may be connected to the indicating instrument 7.

In the example of construction of FIG. 3, tube 31 is the same as tube 1 in FIG. 1. The same applies to the lead-in cables 56 and 6. However, floating body 2 is not provided; rather, tube 31 is arranged next to a vertically mounted pipe line 32, through which a liquid flows. The pipe line 32 consists of a material, which cannot be magnetized, for example of glass. Inside of the pipe line 32 is a body 30 in suspension, the level of which changes dependent on the flow speed of the liquid running through pipe line 32 along the measuring path 34, marked by the double arrow. The body in suspension 30 is provided with a permanent rod magnet 33, which magnet is housed in body 30 in a rotation-symmetrical manner relative to the axis of rotation 34 of body 30. Magnet 35 acts within the are indicated by a dash-and-dot line 36, effecting the closing of the switches inside tube 31. Due to the illustrated high magnetic dispersion, more than one switch may be closed simultaneously under certain circumstances. The construction of FIG. 3 is the same as that of FIG. 1 with respect to the parts which are not visible inside the tube 31 and with respect to the indicating innstrument not shown.

For the sake of clarity, in the example of both FIGS. 1 and 3 the tube is drawn short relative to its thickness and only a low number of switches, namely eight switches, are shown. In practical application, many more switches are provided, for example 20 or 30 switches.

The switching component comprising the carrier strip with switches and resistors mounted thereon and also the appertaining wiring may be manufactured in a standardized manner. Such a standardized switching element, featuring a compact construction is shown in FIG. 4 and 5 in. The carrier strip 50 is made of plastic material and its section is a small rectangular configuration. On one of its flat sides 51, switches 52 of the same type are arranged with an equal spacing, are designed as reed contact switches as described in the context of FIG. 1 are displaced relative to their axes 48 at an angle to the measuring path 53, and are, arranged parallel to one another on the flat side 51. Both connecting lines 58, 59 which are led out of the associated glass tubes 49 are led through the carrier strip 50. On the other flat side 54 the connecting lines 58 located on one side are connected to the common measuring line 55, while connecting lines 59 located at the other side are connected between resistors 57 of the series circuit of resistors 46. The measuring line 55 and the series circuit of resistors 46 can be also constructed as a printed circuitry. If the path to be measured is not straight, then the carrier strip is also curved like the curvature of such path, as indicated in FIG. 6. The illustration as per FIG. 6 is constructed the same as the illustration in FIG. 4. The curved carrier strip is designated by 62 and the switches mounted thereon are designated by 63. Switches 63 are arranged at an appropriate inclination relative to the path, which is curved.

What I claim is:

1. A device for detecting and transmitting the position of a movable member along a measuring path, said device comprising:
   a tube positioned with respect to a fluid medium and having an axis parallel to a path to be measured;
   said tube having positioned therein a plurality of series connected resistors having taps therebetween;
   a plurality of normally open switches, each of said switches being connected at a first end thereof to a respective one of said taps, each said switches being connected at a second end thereof to a common measuring line;
   a movable member positioned in said fluid medium to move along said path, said movable member being mounted to be freely rotatable about an axis thereof parallel to said path;
   said movable member carrying therein switching magnet means for closing one only of said switches when said magnet means is positioned opposite such switch, and for closing two adjacent switches only when said magnet means is positioned opposite a space between such two adjacent switches; and
   indicating means, connected to said series connected resistors and to said common measuring line and responsive to a tapped resistance value across said common measuring line due to closing of switches, for indicating the position of said movable member along said path.

2. A device as claimed in claim 1, wherein said movable member is a ring-shaped element positioned around said tube, and said switching magnet is a ring-shaped permanent magnet magnetized such that the magnetic flux thereof extends radially thereof.

3. A device as claimed in claim 2, wherein said tube is positioned in a liquid medium, and said ring-shaped element is a float body floating in said liquid medium and freely movable along said tube dependent on the level of said liquid medium.

4. A device as claimed in claim 1, wherein said fluid medium comprises a fluid flowing through a pipe having a circular inner cross-section, said pipe being positioned adjacent said tube, and said movable member comprises a body having a circular cross-section and movable along said pipe dependent on the flow of said fluid.

5. A device as claimed in claim 1, wherein each of said switches are positioned in a separate sealed glass tube, said glass tubes are positioned on a first face of a flat insulated carrier strip, said carrier strip extending within said tube parallel to said path, said switches and respective glass tubes being parallelly aligned and extending at an acute angle to said path, connecting wires extending from opposite ends of each of said switches and through opposite ends of respective said glass tubes, said connecting wires extending through said carrier strip to a second face thereof, said common measuring line being positioned on said second face and connected to said connecting wires from said second ends of said switches, and said series connected resistors having taps therebetween being positioned on said second face with said connecting wires from said first ends of said switches being connected to respective of said taps.

* * * * *